United States Patent [19]

Nagai

[11] Patent Number: 4,965,437
[45] Date of Patent: Oct. 23, 1990

[54] TICKET ISSUING APPARATUS

[75] Inventor: Junshiro Nagai, Shizuoka, Japan

[73] Assignee: Tokyo Electric Co., Ltd., Tokyo, Japan

[21] Appl. No.: 304,818

[22] Filed: Jan. 31, 1989

[30] Foreign Application Priority Data

Feb. 5, 1988 [JP] Japan .................................. 63-25167

[51] Int. Cl.⁵ .............................................. G06F 7/08
[52] U.S. Cl. .................................... 235/381; 235/384; 364/407
[58] Field of Search ................. 235/381, 384; 364/407

[56] References Cited

U.S. PATENT DOCUMENTS 4,357,530 11/1982 Roes et al. .
4,359,631 11/1982 Lockwood .......................... 235/381

FOREIGN PATENT DOCUMENTS 61-39268 2/1986 Japan .

*Primary Examiner*—Harold I. Pitts
*Attorney, Agent, or Firm*—Frishauf, Holtz, Goodman & Woodward

[57] ABSTRACT

A ticket issuing apparatus includes a printing section constituted by a printing control circuit and a printing head, a communication interface connected to a desired host computer through a communication channel, and a card connector to which an IC card for storing a printing format is detachably connected. The ticket issuing apparatus also includes a CPU, a ROM, and a RAM which constitute a control circuit for causing the printing section to print ticket data received from the communication interface on ticket paper in accordance with the printing format stored in the IC card, thereby issuing the ticket paper as a ticket.

8 Claims, 5 Drawing Sheets

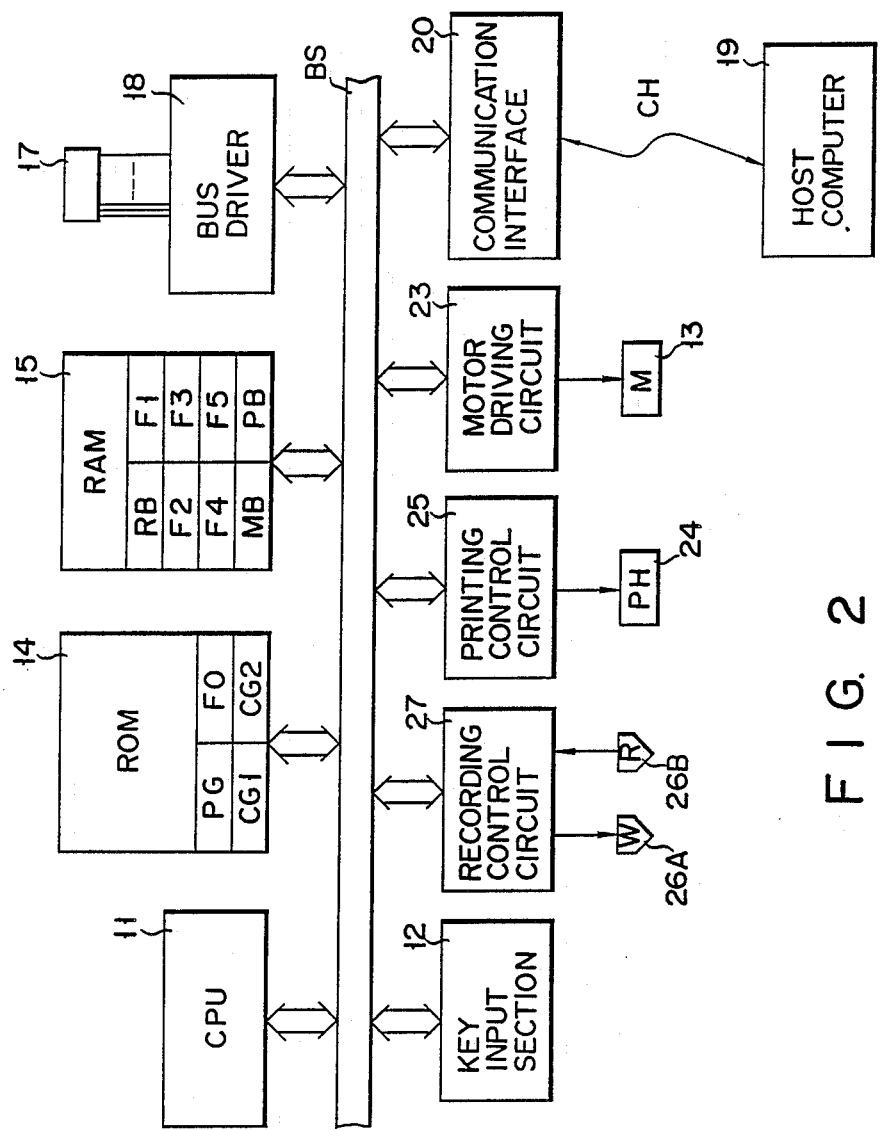
F I G. 2

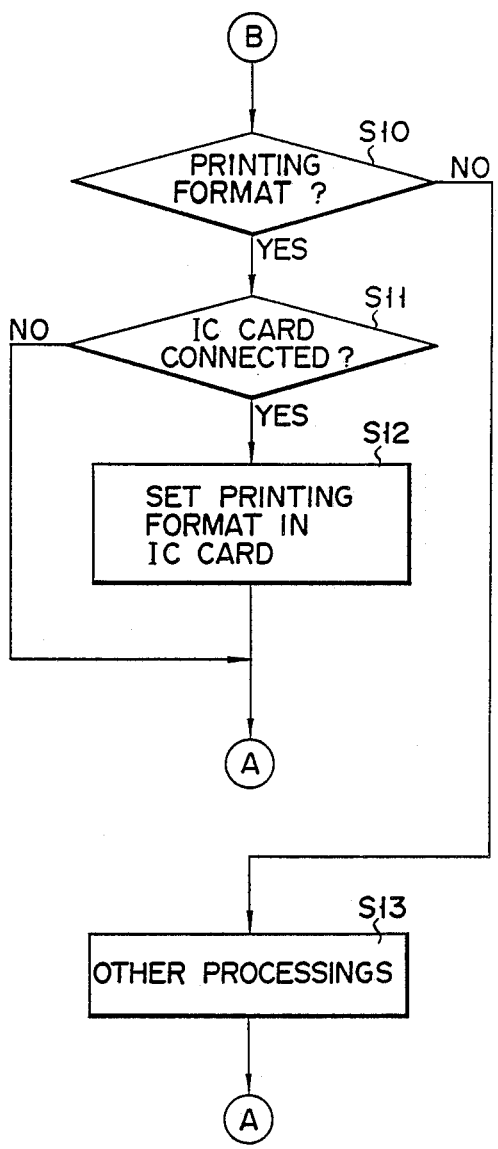
F I G. 3B

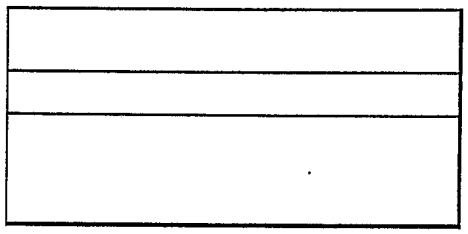
| ABC AIRLINES 88-2-1 |
| TOKYO-OSAKA |
| FLIGHT NO.0001 SEAT NO.1A |
F I G. 4A          F I G. 4B
| CDE AIRLINES |
| FUKUOKA→SAPPORO |
| 88-2-1  SEAT 3B/FLIGHT 123 |
F I G. 5

TICKET ISSUING APPARATUS

BACKGROUND OF THE INVENTION

1. Field of the Invention

The present invention relates to a ticket issuing apparatus for issuing various types of tickets having different printing formats.

2. Description of the Related Art

A plurality of check-in counters are available for check-in procedures in airports. In recent years, these check-in counters are systematically utilized. For example, a plurality of airline companies occupy some of these check-in counters, and remaining check-in counters are commonly used. The common check-in counters are utilized by different airline companies in different time zones to perform speedy check-in operations. That is, each airline company utilizes the common check-in counters in addition to the exclusive check-in counters in its busy flight time zone. A boarding pass is issued by a ticket issuing apparatus at each check-in counter. The issued boarding pass is handed to check-in passenger. Ticket data such as a name of an airline company, a boarding date, places of departure and arrival, a flight number, a seat number, and the like are printed on the boarding pass.

A conventional ticket issuing apparatus is connected to a host computer of a desired airline company through a communication channel. The ticket issuing apparatus receives ticket data and a printing format transmitted from this host computer. The ticket issuing apparatus prints the ticket data on the upper surface of card-like ticket paper in accordance with the printing format and records the ticket data as codes in a magnetic stripe formed on the lower surface of this ticket paper. The ticket paper is then issued as a boarding pass.

The ticket data and the printing format are transmitted from the host computer to the ticket issuing apparatus every time the boarding pass is issued. When many passengers wait for check-in procedures, issuing of the boarding passes is greatly delayed.

In order to shorten a issuing time of the boarding pass, for example, a common printing format can be used by a plurality of airline companies. However, it is very difficult to employ the common printing format because airline companies have unique boarding passes. Alternatively, it is possible to preset different printing formats of these airline companies in the ticket issuing apparatus. However, it is not easy to cope with the cases wherein a new airline company goes into commission and its printing format is added, or printing formats of the airline companies in service are changed.

SUMMARY OF THE INVENTION

It is an object of the present invention to provide a ticket issuing apparatus which can minimize a ticket issuing time.

In order to achieve the above object of the present invention, there is provided a ticket issuing apparatus, comprising a communication circuit to which a desired host computer is connected by means of a communication channel, a port section on which a memory card for storing a printing format is detachably mounted, a printing unit, and a control circuit for causing the printing unit to print ticket data received through the communication circuit on paper in accordance with the printing format stored in the memory card, thereby issuing the paper as a ticket.

In the ticket issuing apparatus, a plurality of memory cards which prestore different printing formats are prepared and are selectively mounted on the port section, thereby issuing different types of tickets. When each memory card is mounted on the port section, the corresponding printing format can be immediately available. For this reason, after the communication circuit receives the ticket data, printing of the ticket data can be immediately started. In addition, memory cards which store new printing formats can be prepared for additions or changes in printing formats.

BRIEF DESCRIPTION OF THE DRAWINGS

FIG. 2 is a block diagram of the ticket issuing apparatus shown in FIG. 1;

FIGS. 3A and 3B are flow charts showing an operation of the ticket issuing apparatus shown in FIGS. 1 and 2;

FIGS. 4A and 4B are respectively plan and rear views of a boarding pass issued by the ticket issuing apparatus shown in FIGS. 1 and 2; and FIG. 5 is a plan view showing a board pass issued in a printing format different from that of the boarding pass shown in FIG. 4A.

DETAILED DESCRIPTION OF THE PREFERRED EMBODIMENT

Figure 1:
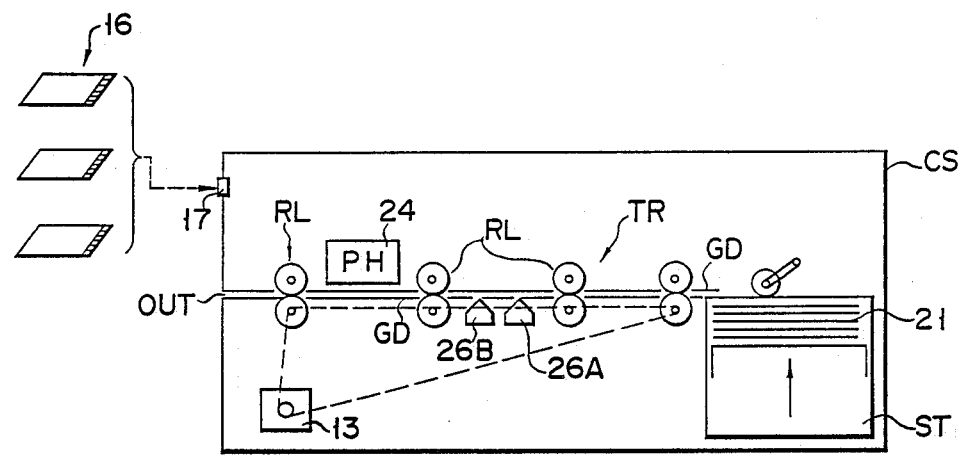
FIG. 1 is a schematic view showing an internal structure of a ticket issuing apparatus according to an embodiment of the present invention.

A ticket issuing apparatus according to an embodiment of the present invention will be described with reference to FIGS. 1 to 5. FIG. 1 schematically shows an internal structure of the ticket issuing apparatus, and FIG. 2 shows a circuit of the ticket issuing apparatus. The ticket issuing apparatus is used to issue, e.g., a boarding pass at an airport check-in counter. Ticket data such as a name of an airline company, a boarding date, places of departure and arrival, a flight number, a seat number, and the like are printed on the upper surface of ticket paper 21 and recorded in a magnetic stripe formed on the lower surface of ticket paper 21 to issue the boarding pass.

The thicket issuing apparatus comprises issuing port OUT formed in the front surface of case CS, stocker ST for storing a plurality of ticket paper 21, and convey mechanism TR for dispensing ticket paper 21 from stocker ST and conveying it toward issuing port OUT. Convey mechanism TR comprises convey path GD formed between issuing port OUT and stocker ST, convey rollers RL arranged along convey path GD, and motor 13 coupled to convey rollers RL. Printing head 24 is arranged above convey path GD to print the ticket data on the upper surface of ticket paper 21. Magnetic head 26A is arranged above convey path GD to record the ticket data in the magnetic stripe formed on the lower surface of ticket paper 21. Magnetic head 26B is arranged above convey path GD on the downstream side of magnetic head 26A to read out the recorded ticket data and check whether the ticket data are properly read out from the magnetic stripe. A plurality of IC cards 16 are prepared for all airline companies in service. Each IC card 16 includes a RAM for storing a printing format of the corresponding airline company and can be detachably connected to card connector 17.

The ticket issuing apparatus comprises CPU 11, key input section 12, ROM 14, RAM 15, bus driver 18, communication interface 20, motor driving circuit 23, printing control circuit 25, recording control circuit 27, and common bus BS. Common bus BS includes an address bus, a data bus, and a control bus which connect these circuit elements to each other. Communication interface 20 is on-line connected with host computer 19 of a desired airline company through communication channel CH. Printing control circuit 25 is connected to printing head 24, and recording control circuit 27 is connected to magnetic heads 26A and 26B. Card connector 17 is connected to common bus BS through bus driver 18. ROM 14 includes memory area PG for storing a control program for CPU 11, memory areas CG1 and CG2 for storing image patterns such as characters and numerals to constitute different character generators, and memory area FO for storing a printing format of a predetermined airline company. Input/output data of CPU 11 is temporarily stored in RAM 15. RAM 15 includes memory area RB constituting a reception buffer for storing ticket data and a printing format received through communication interface 20, five memory areas F1 to F5 for storing each printing format read out from IC card 16 attached to card connector 17, memory area MB constituting a recording buffer, and memory area PB constituting a printing buffer. Each printing format designates items of the ticket data (e.g., the name of airline company, the boarding date, the places of departure and arrival, the flight number, and the seat number) such as a printing start position, a character size, a font, a color, and the number of characters. The printing start position is designated by coordinates of an 18 (rows)×72 (columns) matrix standardized in the boarding pass. For example, a position of the second row and the fifth column is designated by coordinates (2,5).

Figure 3A:
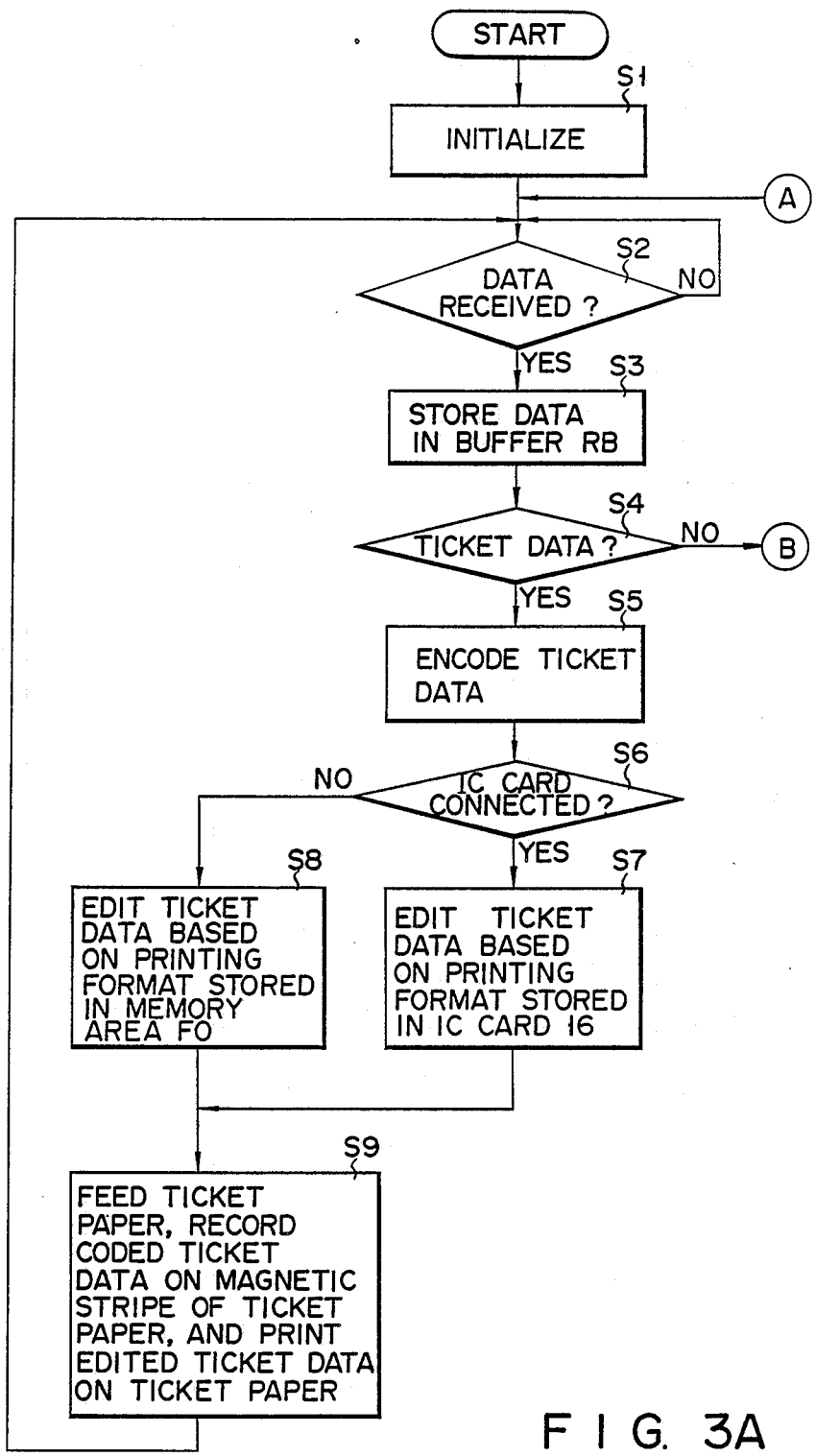

FIG. 3 is a flow chart showing an operation of the ticket issuing apparatus. When the flow is started, initialization is performed in step S1. CPU 11 checks in step S2 whether communication interface 20 receives the data transmitted from host computer 19. If YES in step S2, the reception data is stored in reception buffer RB in RAM 15 in step S3. CPU 11 then determines in step S4 whether the reception data is the ticket data. If YES in step S4, the thicket data is coded and the codes are stored in recording buffer MB in RAM 15 in step S5. CPU 11 determines in step S6 whether IC card 16 is connected to card connector 17. If YES in step S6, the printing format is read out from IC card 16 and stored in one of memory areas F1 to F5 in RAM 15. The reception ticket data is edited on the basis of the printing format in step S7. However, if NO in step S6, the ticket data is edited in step S8 on the basis of the printing format stored in memory area FO in ROM 14 or the printing format stored in one of memory areas F1 to F5 of RAM 15 which is designated by key input section 12. In editing operations in steps S7 and S8, the characters and numerals of the ticket data are converted into image patterns by the character generator which stores the designated fonts. The image patterns together with the printing start position, the character size, the color, and the number of characters are stored in printing buffer PB. In step S9, motor driving circuit 23 drives motor 13. Therefore, ticket paper 21 is dispensed from stocker ST and conveyed toward issuing port OUT. The ticket data stored in recording buffer MB is supplied to recording control circuit 27. Recording control circuit 27 causes magnetic head 26A to record the coded ticket data in the magnetic stripe on ticket paper 21 when ticket paper 21 passes by magnetic head 26A. The recorded ticket data is read out by magnetic head 26B and checked by recording control circuit 27. When a recording error is found, error processing is performed. However, if a recording error is not found, the content of printing buffer PB is supplied to printing control circuit 25. The ticket data is printed on ticket paper 21 in accordance with the designated printing start position, character size, color, and the number of characters. Ticket paper 21 is issued from issuing port OUT as a boarding pass. Thereafter, the operations are repeated from step S2.

When CPU 11 detects in step S4 that the reception data is not the ticket data, CPU 11 then checks in step S10 whether the reception data represents a printing format. If YES in step S10, CPU 11 checks in step S11 whether IC card 16 is connected to card connector 17. If NO in step S11, the operations from step S2 are performed. However, if YES in step S11, the received printing format is set in the RAM in IC card 16, and the flow returns to step S2. If the reception data is determined not to be the printing format in step S10, other processings are performed, and the flow returns to step S2.

FIGS. 4A and 4B show the upper and lower surfaces of the boarding pass issued by this ticket issuing apparatus, and FIG. 5 shows a boarding pass issued in a printing format different from that of the boarding pass shown in FIG. 4A.

In this embodiment, a check-in clerk of each airline company attaches IC card 16 which stores the corresponding printing format to card connector 17 to connect communication interface 20 to corresponding host computer 19 through communication channel CH. In this state, the ticket data transmitted from this host computer 19 is printed on ticket paper 21 in accordance with the printing format stored in this IC card 16, thereby issuing a boarding pass. In this case, by exchanging IC card 16 connected to card connector 17, various boarding passes having different printing formats can easily be issued. As compared with the case wherein the printing format is transmitted through communication channel CH, an issuing time of the boarding pass can be shortened. New IC cards 16 are easily prepared for additions and changes in printing formats.

In this embodiment, since the predetermined printing format is stored in memory area FO in ROM 14, the boarding pass of the airline company corresponding to this printing format can be issued without attaching IC card 16 to card connector 17. When the printing format is read out from IC card 16 connected to card connector 17, this printing format is stored in one of memory areas F1 to F5 in RAM 15. For this reason, even after IC card 15 is disconnected from card connector 17, a maximum of five different printing formats can be prepared.

In the above embodiment, when IC card 16 is connected to card connector 17 and the printing format can be transmitted from host computer 19, the printing format can be set in IC card 16. For this reason, IC card 16 which stores the printing format of each airline company can be easily duplicated. When the printing format is stored in IC card 16, a commercially available personal computer can be used to write the printing format.

The present invention is not limited to the particular embodiment described above. Various changes and modifications may be made without departing from the spirit and scope of the invention. In the above embodiment, a single printing format is stored in each IC card 16. However, a plurality of different printing formats may be stored in IC card 16. In this case, a control program for CPU 11 is modified to read out the printing formats from IC card 16 connected to card connector 17 and to execute processing for one of the printing formats. Therefore, a plurality of airline companies in cooperation with each other can use common IC card 16.

In this above embodiment, the character generators are arranged in ROM 14. However, a character generator may be arranged in IC card 16, and character patterns may be read out together with a printing format from IC card 16. The readout data may be stored in RAM 15. In this case, by using ticket data read out from IC card 16 by a character generator, the ticket data may be printed with special fonts. In addition, IC card 16 may have a ROM which stores a printing format.

Furthermore, an issuing mode of the boarding pass and a write mode of IC card 16 are distinguished from each other in accordance with the type of data (i.e., ticket data or printing format) transmitted from host computer 19. However, the control program for CPU 11 may be programmed such that the boarding pass issuing mode and the write mode of IC card 16 may be input from key input section 12.

What is claimed is:

1. A ticket issuing apparatus comprising:
   a printing section;
   a communicating circuit to which a desired host computer is connected by means of a communication channel;
   a port section to which a memory card for storing a printing format is detachably connected; and
   control means for causing said printing section to print ticket data received by said communicating means on paper in accordance with the printing format stored in said memory card, thereby issuing the paper as a ticket.

2. An apparatus according to claim 1, wherein said control means comprises memory means for storing the printing format read out from said memory card connected to said port section.

3. An apparatus according to claim 2, wherein said memory means includes a plurality of memory areas each for storing the printing format read out from said memory card connected to said port section.

4. An apparatus according to claim 3, wherein said control means includes a control circuit for designating the printing format read out from said memory card and stored in one of said plurality of memory areas so as to perform printing processing when said memory card is detected to be connected to said port section.

5. An apparatus according to claim 3, wherein said control means includes a control circuit for designating the printing format read out from said memory card and stored in one of said plurality of memory areas so as to perform printing processing when said memory card is detected to be connected to said port section, and for designating one of the printing formats already stored in said plurality of memory areas so as to achieve printing processing when said memory card is detected not to be connected to said port section.

6. An apparatus according to claim 3, wherein said memory means further comprises a memory area for storing a predetermined printing format, and said control means includes a control circuit for designating the printing format read out from said memory card and stored in one of said plurality of memory areas so as to perform printing processing when said memory card is detected to be connected to said port section, and for designating one of the printing formats already stored in said plurality of memory areas so as to achieve printing processing when said memory card is detected not to be connected to said port section.

7. An apparatus according to claim 1, wherein said control means comprises first memory means for storing the printing format read out from said memory card connected to said port section, second memory means for storing a predetermined printing format, and a control circuit for designating the printing format stored in said first memory means so as to perform printing processing when said memory card is detected to be connected to said port section, and for designating the predetermined printing format stored in said second memory means so as to perform printing processing when said memory card is detected not to be connected to said port section.

8. An apparatus according to claim 1, wherein said control means comprises means for writing the printing format transmitted from said host computer and received by said communication circuit in said memory card connected to said port section.

* * * * *